United States Patent [19]
Mann

[11] 3,718,347
[45] Feb. 27, 1973

[54] ADJUSTABLE SWING HITCH FOR VEHICLES
[76] Inventor: Frederick W. Mann, Waterville, Kans. 66548
[22] Filed: Nov. 16, 1970
[21] Appl. No.: 89,858

[52] U.S. Cl. ................280/467, 280/482, 280/491
[51] Int. Cl. ...............................................B60d 1/00
[58] Field of Search...280/478 R, 478 A, 478 B, 472, 280/467, 482, 456, 491

[56] References Cited
UNITED STATES PATENTS

| | | | |
|---|---|---|---|
| 3,397,900 | 8/1968 | Sturges | 280/478 R |
| 3,169,028 | 2/1965 | Scrivner | 280/478 R |
| 3,410,577 | 11/1968 | Luinstra | 280/478 A |

Primary Examiner—Leo Friaglia
Assistant Examiner—Robert R. Song
Attorney—John H. Widdowson

[57] ABSTRACT

A hitch for vehicles includes a mounting and a hitch pivotal, extendable and translatable relative the mounting. A resilient lock secures the hitch. More particularly the hitch is adapted to mount on the rear of a vehicle with a hitch that is adapted to be translatably positionable on the mounting, and adapted to be rotatably and extendably positionable therefrom to be coupled with a trailer vehicle, or the like, then retracted to a locked position.

5 Claims, 6 Drawing Figures

PATENTED FEB 27 1973

INVENTOR
FREDERICK W. MANN

BY John H. Widdowson
ATTORNEY

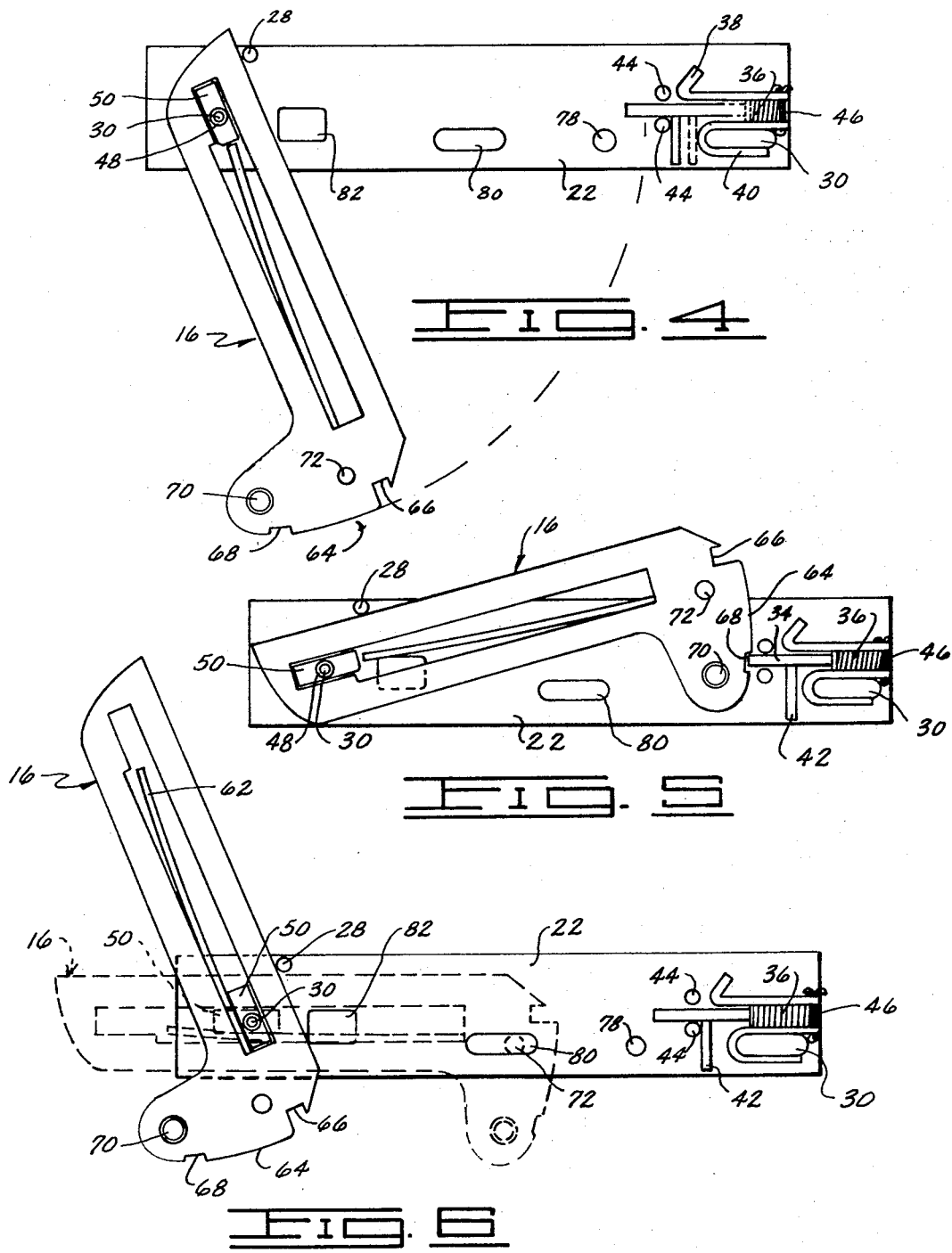

ADJUSTABLE SWING HITCH FOR VEHICLES

Numerous types of exposable and retractable hitches and vehicle couplings are known in the prior art operable to be positioned in an extended position for use and positionable in a storage position when not in use. Generally these prior art devices have a tongue or the like which is pivotally attached at one end to the tow vehicle or its bumper and attachable on the opposite end with a trailer vehicle or the like. When in the usable position, these prior art devices hold the tongue in one fixed position relative the vehicle and are not adjustable to position the attaching portion to other fixed positions. Also, these prior art devices are so constructed that the trailer vehicle is couplable with the hitch only when it is in the extended and fixed position.

In one preferred specific embodiment of this invention, an adjustable swing hitch for vehicles includes a mounting comprising a housing mountable with a vehicle having an extendably, pivotably and translatably mounted hitching bar for attachment with a trailer vehicle or the like. The hitching bar is retractable into the housing for storage purposes and positionable for use in a plurality of laterally fixed positions. The mounting housing includes a pair of parallel plate members provided with apertures therethrough for mounting with the vehicle and adapted to hold the hitching bar member therebetween. The hitching bar member is an elongated bar like member and includes an end portion having apertures connectable with the trailer vehicle, and a slot extending through the center portion thereof. A floating member mounted in the slot is adapted to provide rotational and translational movement of the bar member within the housing and about the slot thereby rotating, translating and extending movement of the hitching bar. A lock is provided to prevent inadvertent translational movement of the hitching bar member about the floating member, and another lock is provided to hold the bar member in a fixed rotational position for use and storage. The adjustable swing hitch of this invention provides a hitch that can be stored in an out-of-the-way position or extended for use and held in a plurality of lateral positions. The bar member of the hitch can be extended from the housing, coupled with a trailer vehicle or the like then by forward and rearward movement of the tow vehicle returned to a locked position for use.

One object of this invention is to provide an adjustable swing hitch for vehicles overcoming the aforementioned disadvantages of the prior art devices.

Still one object of this invention is to provide an adjustable swing hitch for vehicles having a mounting housing with a hitching bar member extendable therefrom in a translatable and rotatable manner for coupling with a trailer vehicle or the like and retractable to a locked position for use.

Still another object of this invention is to provide an adjustable swing hitch for vehicles which can be positioned for use in a plurality of translatably different centered and off-centered lateral positions for use and which can be positioned in an out-of-the-way position for storage.

Yet one further object of this invention is to provide an adjustable swing hitch having a lock in the hitching bar member to provide for extension, retraction and translatable positioning of same and another lock in the housing engageable with the hitching bar to control its rotation and to hold it in a fixed position for use and a fixed position for storage.

Various other objects, advantages, and features of the invention will become apparent to those skilled in the art from the following discussion, taken in conjunction with the accompanying drawings, in which:

FIG. 4 is a cut-away top plan view of the hitch alone with the hitching bar shown in the fully swung-out and extended position;

FIG. 5 is a cut-away top plan view of the hitch alone with the hitching bar shown in the out-of-the-way storage position; and FIG. 6 is a cut-away top plan view of the hitch alone with the hitching bar shown in the rotated and retracted position in solid lines and with the hitching bar shown in a translated position in dashed lines.

Figure 1:
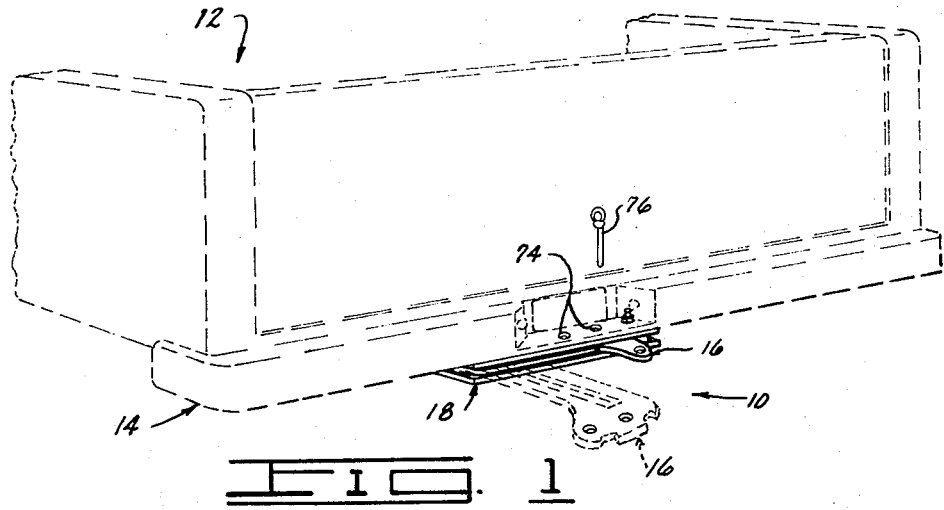
FIG. 1 is a perspective view taken from the rear and above of the rear end portion of a truck vehicle bed, shown in dashed lines, with the hitch mounted below the bumper shown in a normal use position in solid lines and shown in the swung-out position in dotted lines.

The following is a discussion and description of preferred specific embodiments of the adjustable swing hitch for vehicles of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, an adjustable swing hitch of this invention is shown therein, generally indicated at 10, mounted with a truck vehicle 12 on the bumper 14 thereof. The adjustable swing hitch 10 includes a hitching bar member 16 mounted to pivotally and transversely extend from the mounting housing 18.

The mounting housing 18 includes a pair of elongated rectangular top and bottom plate members 20 and 22 respectively and held in a parallel spaced relation by a rotation lock assembly 24 at one end and a floating block assembly 26 in the hitching bar member 28 at the outer end thereof. Both the upper 20 and lower 22 plate members have apertures 30 therethrough to provide for attaching the housing 18 to a bumper 14 with bolts 32; the plates have other apertures as shown which will be described hereafter. The rotation lock assembly 24 has a locking pin 34 urged by a spring 36 to extend toward the hitching bar member 16 enclosed on two sides by the plate members 20 and 22 and between guide members 38 and 40. The guide members 38 and 40 are preferably shaped as shown in FIGS. 3, 4, 5 and 6; they are attached to the plate members 20 and 22 and serve to hold them in a parallel relation by partially encircling the attachment bolt aperture 30, thereby preventing warping of the plate members when the mounting bolts 32 are drawn up. The locking pin 34 is provided with a trigger 42 for easy finger movement, guide pins 44 along the shaft of the pin 34 to guide it and retain the trigger 42. Also, the rotation lock assembly 24 is provided with a removable spring retaining pin 46 at the outer end of the housing 18 so the spring 36 can be removed and replaced as necessary. At the opposite end of the housing 18 the floating block assembly 26 is attached between the plate members 20 and 22; it includes a sleeve 48 attached to the plates 20 and 22 about the aperture 30 and a rectangular floating block member 50 free to rotate about the sleeve 48. The sleeve 48 is provided about the aperture 30 so when the hitch 10 is mounted and the mounting bolts 30 and drawn up, it will not warp the plates 20 and 22 or move them substantially from the parallel relation.

Figure 3:
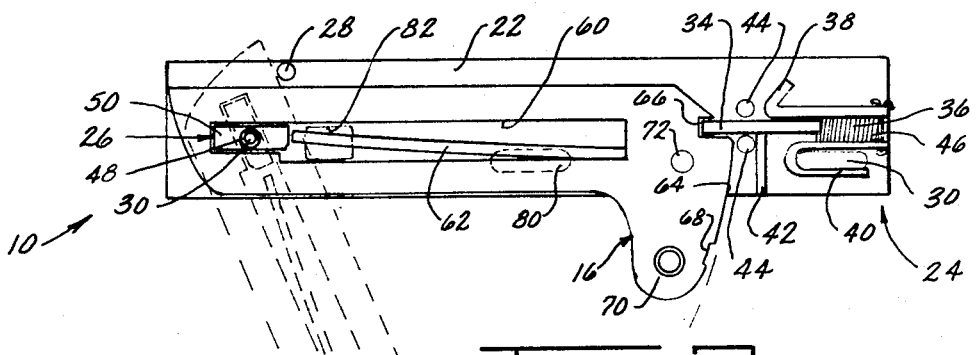
FIG. 3 is a cut-away top plan view of the hitch alone with the hitching bar shown in the normal use position in solid lines and with the hitching bar shown in the fully swung-out and extended position in dashed lines.

The hitching bar member 16 is preferably shaped as shown in FIGS. 3, 4, 5 and 6; practice has shown this to be an operable overall configuration. The hitching bar member 16 has an elongated substantially rectangular slot 60 therethrough extending most of its length positioned around the floating block assembly 26; it contains an elongated leaf spring member 62 attached at one end to a side of the slot 60. The leaf spring member 62 is shaped such that in the uncompressed state its free end is adjacent the floating block member preventing it from moving in the slot 60. The attaching end of the hitching bar member 16 is arcuately shaped on the outer end thereof, indicated at 64, has a notch 66 to engage the locking pin 34 in the normal position, a notch 68 to engage the locking pin 34 in the storage position, an aperture 70 to attach a trailer vehicle or the like and an aperture 72 to hold the hitching bar member 16 in a fixed translated position. The arcuate shaped end 64, as shown, has been found satisfactory in practice in providing a deep secure notch 66 to engage the locking pin 34 in the normally used position as indicated in FIG. 3 and provide a shallow notch 68 for just holding the hitching bar member 16 in the out-of-the-way stored position, as indicated in FIG. 5. The aperture 70 is normally used to attach a clevis pin or trailer ball for use in pulling a trailer vehicle or whatever. The other aperture 72 is used to secure the hitching bar member 16 in position by inserting a safety pin 76 through an aperture 74 in the bumper, and through an aperture 78 in the top 20 and bottom 22 plate members of the housing 18. The safety pin 76 provides security should the lock assembly 24 fail. The plates 20 and 22 of the housing 18 are provided with an additional elongated aperture 80 so the safety pin 76 can be inserted through auxilliary apertures in the safety bumper 14 so the hitching bar member 16 can be positioned transversely and secured as shown in the dotted lines of FIG. 6. For access to the leaf spring 62 the lower plate member 22 has a rectangularly shaped aperture 80 therethrough preferably positioned as shown. The rectangular aperture 80 is sufficiently large for a person to reach inside the housing 18 with his fingers and press the leaf spring 62 against the attached side of the slot 60; this allows the floating block 50 to traverse the slot 60 so the hitching bar member can be retracted.

Figure 2:
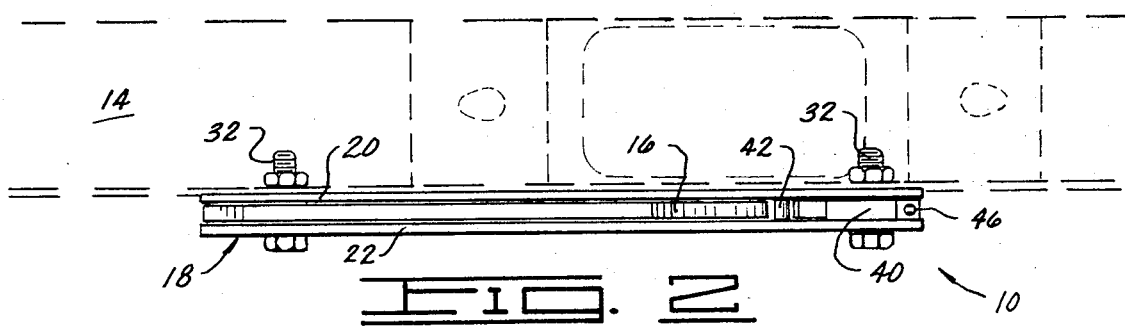
FIG. 2 is a rear elevation view of the hitch and bumper with the hitch shown in the normal use position.

The adjustable swing hitch 10 of this invention is constructed so it can be easily attached to the safety bumper 14 of a truck vehicle 12. Since not all safety bumpers 14 are constructed similarly, the hitch is so constructed that it can be easily mounted without modification on most of the conventional styles of safety bumpers. As shown in FIGS. 1 and 2 a conventional safety bumper 14 has three, apertures 74 in the center portion which are provided for coupling vehicles, trailer hitches and the like to the bumper. The adjustable swing hitch 10 can be attached to the safety bumper 14, as shown in FIGS. 1 and 2 by bolts 32 through the apertures 30 at opposite ends of the hitch 10. Preferably the rotation lock assembly 24 is placed on the right of the bumper 14 as shown. The left end of the hitch 10 is attached to the bumper 14 by a bolt extending through an aperture that must be placed in the bottom of the bumper 14. The open outer left end aperture 74 of the bumper 14 will be aligned over the elongated aperture 80 in the housing. With the hitch 10 attached to the bumper 14 as shown, the safety pin 76 will slip through the center aperture 74 in the bumper 14, the apertures 78 in the housing 18 and the aperture 72 in the hitching bar member 16.

It is to be noted that the adjustable swing hitch for vehicles 10 of this invention can be mounted with a vehicle safety bumper as described; however, it is not to be limited to the specific manner of installation with a safety bumper, it can be welded to a vehicle bumper or constructed integrally with it and function similarly with the same structural components.

Use of the adjustable swing hitch 10 is illustrated in the drawings. The normally used and center secured position of the hitch 10 is that shown in the solid lines in FIGS. 1 and 3 with the locking pin 34 secured in the notch 66 and the floating block member 50 held in the end of the slot 60 by the leaf spring 62. The normally secured centered position is the position most frequently used; it positions the coupling aperture 70 in the hitching bar member 16 directly in line with the center aperture 74 in the safety bumper 14 and centrally behind the towing vehicle. From the normally secured center position the hitch 10 can easily be placed in the storage position as shown in FIG. 5. To place the hitch 10 in this out-of-the-way storage position any trailer ball or clevis pin placed through the aperture 70 in the hitching bar member 16 must be removed; the trigger 42 is moved pulling the locking pin 34 from contact with the arcuate end 64, and the hitching bar 16 is rotated to the position shown in FIG. 5, the locking pin is engaged in the shallow notch 68. In this out-of-the-way storage position no portion of the hitching bar member 16 sticks out beyond the housing 18, and for security the safety pin 76 can be inserted through the apertures 74, 70 and 78. Also, the back side of the hitching bar member 16 contacts the stop 28, thus preventing it from swinging past the lock assembly 24 and underneath the vehicle. In practice it has been found the combination of the rotation lock assembly 24 and the safety pin 76 prevents the hitching bar member 16 from rattling inside the housing when it is in the storage position.

The adjustable swing hitch 10 has a swinging action used to simplify coupling the vehicle mounting the hitch 10 and a trailer or the like. When the hitch 10 is to be coupled to a trailer, for instance, the tow vehicle is backed up to the trailer tongue so the trailer tongue is just to the left of the center of the hitch and a short distance from it. When in this position, the arcuate end 64 of the hitching bar member 16 is released from the lock assembly 24 and rotated from the housing as shown in FIG. 1. The leaf spring 62 is then compressed against the attached side of the slot 60 releasing the floating block assembly 26 so the hitching bar member 16 can be extended and retracted. The hitching bar member 16 can now be moved freely, within limits, in order to position it for easy connection to the trailer tongue. As can be seen in the drawings, the hitching bar member 16 is prevented from rotating over the center of rotation to the left by the stop 28, and with the floating block free it can be moved to extremes as shown in FIGS. 4 and 6. Once it is connected the tow vehicle simply pulls forward, thus pulling the hitching bar member to the fully extended position where it is automatically locked in place by the leaf spring 62; this positions the hitch 10 as shown in FIG. 3; then the tow vehicle backs up rotating the hitching bar member into the normally secured centered position. After the hitch 10 is in the secured centered position, the safety pin 76 is preferably inserted to secure the locked position of the hitch.

Another feature of the adjustable swing hitch 10 is that once it is coupled with a trailer or the like it can be adjusted to position the coupling aperture 70 by sufficiently off-center so trailer vehicles such as hay bailers which have the pulling tongue off-center can be pulled in position more centered behind the tow vehicle. To do this the hitch 10 is put in the secured centered position as described above, then the leaf spring 62 is released by reaching with fingers through the aperture 82; the hitching bar member 16 is slid to the side as shown in the dotted lines in FIG. 6. With the hitch in this off-center position, the safety pin 76 can be inserted through the aperture 74 in the bumper 14, aperture 72 in the hitching bar member 16 and aperture 80 in the housing 18 to secure the hitch.

In the manufacture of the adjustable swing hitch for vehicles 10 of this invention, it is seen that the housing 18, hitching bar member 16 and other parts thereof can be easily formed from sheet material and would require no closely machined tolerances in production thereof. The hitch 10 can be constructed in various lengths with different aperture spacings to facilitate mounting on different sizes of safety bumpers, and it can be constructed of various gauges of material to accommodate handling different sized loads.

In the use and operation of the adjustable swing hitch for vehicles 10 of this invention, it is seen that same provides a hitch that can be easily extended and manipulated to be positioned for easy attachment to a trailer vehicle tongue or the like. The hitch 10 can be positioned so as to pull trailer vehicles off-center as well as directly behind the center of the tow vehicle; and when not in use, the hitching bar member 16 can be stored inside the housing substantially out of sight. Also, the hitch 10 is adapted for easy mounting with the popular and conventional styles of safety bumpers commonly used on pickup trucks and other vehicles.

As will become apparent from the foregoing description of the applicant's adjustable swing hitch for vehicles, relatively inexpensive and simple means have been provided to connect vehicles in a rapid manner without the heretofore necessity of exactly aligning the couplings before connecting them. The hitch structure is easily constructed, simple to use, mountable with conventional safety bumpers and is storable out of sight within its housing when not in use.

While the invention has been described in conjunction with preferred specific embodiments thereof, it will be understood that this description is intended to illustrate and not to limit the scope of the invention, which is defined by the following claims.

I claim:

1. A hitch for vehicles comprising:
   a. a housing including a pair of similar parallel plate members mountable under the rear bumper of the vehicle,
   b. bar means hitching means mounted within said housing and having a bar member with an elongated opening therein mounted about a floating member pivotally connected to and between said plate members, said bar member movable to any radial position limited to the length of said opening and from the pivotal connection of said floating member and movable rearwardly of the outer edge of said plate members to a storage condition,
   c. means pivotally, extendably and translatably mounting said hitching means on said housing, and
   d. resilient means urged locking means mounted on said housing constructed and adapted to lock said hitching means against rotation and extention,
   said hitch for vehicles adapted to be mounted on the rear of a vehicle, said hitching means translatably positionable on said housing to a fixed position and said hitching means rotatably extendable and translatably extendable from said housing and couplable with a trailing vehicle or the like, and retractable to a locked position.

2. The hitch for vehicles as described in claim 1, wherein:
   a. said bar means is movable laterally within said housing to a second fixed position for offset coupling with a trailing vehicle, and
   b. said hitching means is movable to a storage position without any portion thereof extended rearwardly of said housing so that the vehicle can be pushed from the rear, if desired.

3. The hitch for vehicles, comprising:
   a. mounting means mountable on a vehicle,
   b. hitching means,
   c. means to pivotally, extendably and translatably mount said hitching means on said mounting means,
   d. resilient means urged locking means mounted on said mounting means constructed and adapted to lock said hitching means against rotation and extension,
   e. said hitching means is a bar means mounted within said housing,
   f. said mounting means includes a pair of similar elongated rectangular parallel plate members,
   g. said mounting means is mounted on the vehicle so that said hitching bar means is horizontally extendable therefrom,
   h. said hitching bar means has an elongated bar like member extending substantially the length of said housing,
   i. said means to pivotally, extendably and translatably mount said hitching means is an elongated slot like aperture therethrough and substantially the length thereof said hitching bar means having a floating member therein pivotably attached to said housing between said plate member adapted to be positionable at one end of said slot by a portion of said resilient urged locking means having a leaf spring member attached at one end to an inner side of said slot uncompressibly positioned in the center of said slot and adapted to be compressed at the free end thereof to provide movement of said floating member through said slot, and j. said hitching bar member has a means to engage said rotation locking means on the extendable end thereof.

4. The hitch for vehicles as described in claim 3, wherein:
   a. said housing has a stop member therebetween said plate members positioned so as to be adapted to prevent said bar member from rotating over the center of rotation about said floating member relative said rotation locking means,
   b. said rotation locking means has a spring urged locking pin member normally extended with the end thereof engageable with said bar member,
   c. said spring urged locking pin member is retractable from said normally extendable position to disengage said rotation locking means by finger pressure,
   d. said means to engage said rotation locking means is the arcuate shaped end of said hitching bar member having a plurality of indentations therein adapted to receive said locking pin and position said bar member in a plurality of positions.

5. The hitch for vehicles as described in claim 4, wherein:
   a. said housing has a plurality of apertures therethrough said plate members adapted to be used to mount same with said vehicle,
   b. said hitching bar member has a plurality of apertures therethrough said arcuate shaped end portion, an aperture thereof said said plurality is adapted to be used to couple said hitching bar member to a trailer vehicle or the like, another of said plurality of apertures is adapted to be used in combination with a safety pin member and an aperture therethrough said housing to position and hold said hitching bar member in a spaced transverse position relative said rotation locking means, and
   c. one of said rectangular plate members of said housing has an enlarged aperture therethrough adapted to provide finger access to said extension locking means for compressing said leaf spring member at the floating member end portion thereof.

* * * * *